United States Patent [19]
Mergell et al.

[11] Patent Number: 5,695,045
[45] Date of Patent: Dec. 9, 1997

[54] STUD FEEDER

[75] Inventors: Bruno Mergell, Wetzlar-Steindorf; Hans Peter Seng, Reiskirchen; Hans Wiessler, Wettenberg; Alfred Gerhardt, Lahnau-Waldgirmes; Norbert Tessarsch, Giessen, all of Germany

[73] Assignee: Emhart Inc., Newark, Del.

[21] Appl. No.: 558,901

[22] Filed: Nov. 16, 1995

[30] Foreign Application Priority Data

Nov. 18, 1994 [DE] Germany ............... 9418373 U

[51] Int. Cl.⁶ .................................................. B65G 25/04
[52] U.S. Cl. ................................. 198/747; 227/147
[58] Field of Search ............................. 198/389, 747; 221/232, 268; 227/147

[56] References Cited

U.S. PATENT DOCUMENTS 3,147,484  9/1964  Nelson .................. 227/147
3,647,129  3/1972  Ehrlich ................. 221/268
4,027,136  5/1977  Taylor .

FOREIGN PATENT DOCUMENTS 769596   3/1957  United Kingdom .
2157609  10/1985  United Kingdom .

Primary Examiner—Joseph E. Valenza
Attorney, Agent, or Firm—E. D. Murphy

[57] ABSTRACT

Stud feeder with an adapter (1), in which a conveying duct (4) and a stud feed orifice (3) designed substantially perpendicularly to the conveying duct (4) are provided, with a cylindrical or slightly conical stud holder (2) arranged coaxially to the conveying duct (4) and with a loading pin (10) which is capable of moving to and fro in the conveying duct (4) and which displaces studs (9) from the stud feed orifice (3) to the stud holder (2), characterized in that the conveying duct (4) is formed by a tubular gripper (5) which is slotted at least over a proportion of its length, and the gripper segments (6) are resilient substantially perpendicularly to their length.

8 Claims, 2 Drawing Sheets

STUD FEEDER

BACKGROUND OF THE INVENTION

The invention relates to a stud feeder comprising an adapter in which a conveying duct and a stud feed means formed substantially perpendicularly to the conveying duct are provided. A stud holder is connected to the conveying duct of the adapter coaxially thereto.

SUMMARY OF THE INVENTION

Stud feeders of this type are connected to a feed means in which studs are conveyed toward a conveying duct. The feed means is an elastic tube of which the internal cross section corresponds substantially to the longitudinal section of a stud. It should be noted that the term stud refers to studs having a head (T-studs). The stud entering the conveying duct through the stud feed means is already correctly orientated making it unnecessary to rotate the stud. The stud is then conveyed to the stud holder by means of a loading pin which is capable of moving to and fro in the conveying duct. The stud holder is pretensioned and brings the stud to the predetermined welding position.

If a stud, in particular a weld stud, of which the external cross section to length ratio is high are fed to the stud feeder, there is a risk that the stud will wobble in the conveying duct and not therefore reach the stud holder in the correct position. This inevitably leads to faulty positioning of the stud during subsequent use thereof.

An object of the invention is to develop the known stud feeder so as to permit secure and reliable positioning of the stud in the stud holder, even in the case of studs having a short shank, in particular a shorter shank length than head diameter.

This object is achieved with a stud feeder with an adapter (1), in which a conveying duct (4) and a stud feed orifice (3) designed substantially perpendicularly to the conveying duct (4) are provided, with a cylindrical or slightly conical stud holder (2) arranged coaxially to the conveying duct (4) and with a loading pin (10) which is capable of moving to and fro in the conveying duct (4) and which displaces studs (9) from the stud feed orifice (3) to the stud holder (2), characterized in that the conveying duct (4) is formed by a tubular gripper (5) which is slotted at least over a proportion of its length, and the gripper segements (6) are resilient substantially perpendicularly to their length.

It is proposed according to the invention that the conveying duct be formed by a tubular gripper which is slotted at least over a proportion of its length. The slotted gripper has several gripper segments which are formed to be resilient in a direction substantially perpendicular to the length. The free cross section of the conveying duct formed by the gripper is smaller than the cross section of the stud head. This ensures positionally correct passage of the stud through the conveying duct to the stud holder. The resiliently designed gripper segments grip the stud on its head. If the stud is located in an oblique position in the conveying duct and if the loading pin comes to rest against the stud head, the stud is orientated as it initially rights itself owing to the friction of the head between the gripper segments and is then displaced in an axially parallel manner together with the loading pin to the conveying duct.

The slots in the tubular gripper can extend over a proportion of the length of the gripper. They can be formed from the stud inlet end of the gripper in the direction of the other end of the gripper. The gripper is advantageously slotted alternately from one or other end.

To achieve a uniform resilient effect of the individual gripper segments it is proposed that the slots be formed equidistantly from one another. If the gripper is designed with equidistant slots, the width of the individual gripper segments is invariably equal.

According to a further idea, it is proposed that the gripper be designed with an entry bevel at the stud inlet end. This entry bevel has the advantage that the stud can be introduced more easily into the conveying duct formed by the gripper.

During the conveyance of a stud, a force acting in the conveying direction is produced owing to the friction between the gripper segments and the stud. To ensure that the gripper is not pulled out of the adapter by this force, it is proposed that the gripper be designed, preferably at the stud inlet end, with at least one catch nose or one collar which penetrates into a recess formed in the adapter.

The gripper segments are advantageously made of spring steel and/or provided with a very hard coating. This ensures that no wear or only slight wear of the gripper segments takes place owing to the friction occurring between the gripper segments and the stud head.

Further advantages and features of the stud feeder according to the invention will be described with reference to a preferred embodiment.

DESCRIPTION OF THE PREFERRED EMBODIMENT

Figure 1:
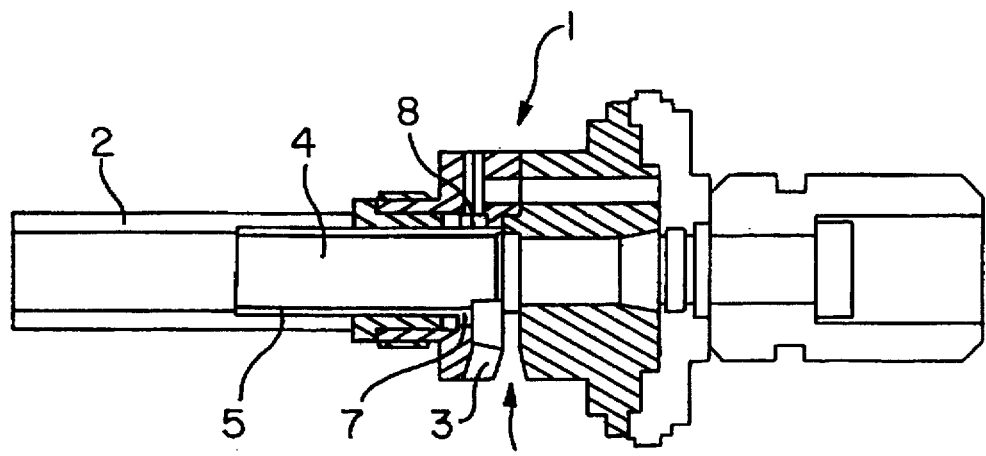
FIG. 1 shows a stud feeder in a full section.

The stud feeder comprises an adapter 1 and a stud holder 2. A conveying duct 4 is formed in the adapter 1. A stud feed orifice 3 opens into the conveying duct 4. The feed direction of a stud is indicated by the arrow in FIG. 1. The conveying duct 4 is formed by a tubular gripper 5 which is slotted at least over a proportion of its length. The individual gripper segments 6 are designed resiliently substantially perpendicularly to their length.

Figure 2:
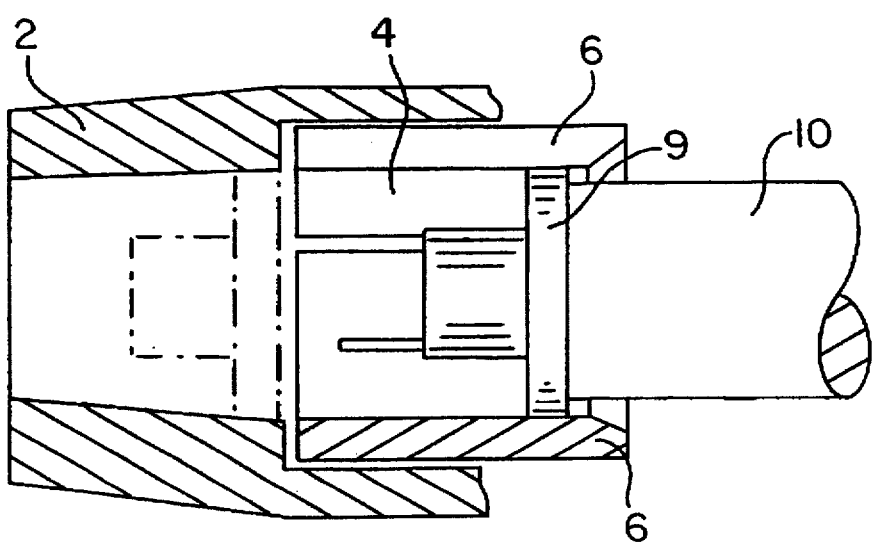
FIG. 2 shows the gripper in co-operation with stud and loading pin schematically in a full section.

The gripper 5 has, at its inlet end, catch noses 7, 8 which penetrate into corresponding recesses in the adapter 1. A stud 9 is introduced through the stud feed orifice 3 into the conveying duct 4. A loading pin 10 which is preferably pneumatically driven displaces the stud 9 through the conveying duct 4 to the stud holder 2. In order to introduce the stud 9 into the conveying duct 4, an entry bevel 11 is formed on the gripper 5. The free cross section of the conveying duct 4 is smaller than the free cross section of the stud head 12. The stud 9 is conveyed, with elastic enlargement of the conveying duct 4 and while overcoming a frictional force occurring between stud head 12 and the gripper segments 6, to the stud holder 2, as indicated by the broken line in FIG. 2.

Figure 3:
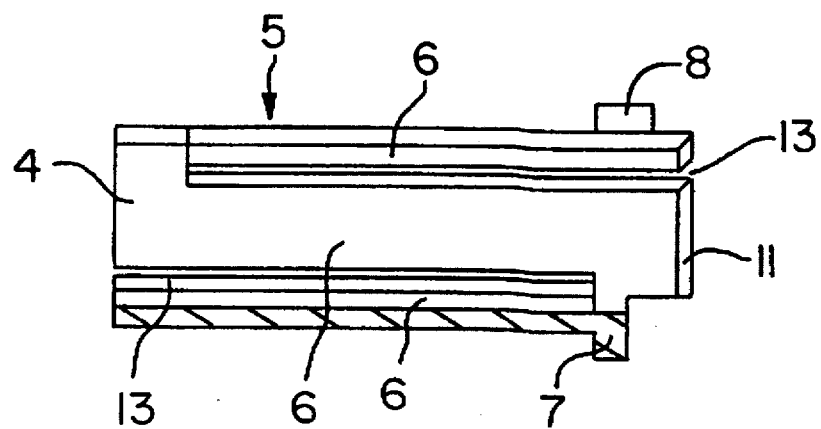
FIG. 3 shows a gripper in a full section.
Figure 4:
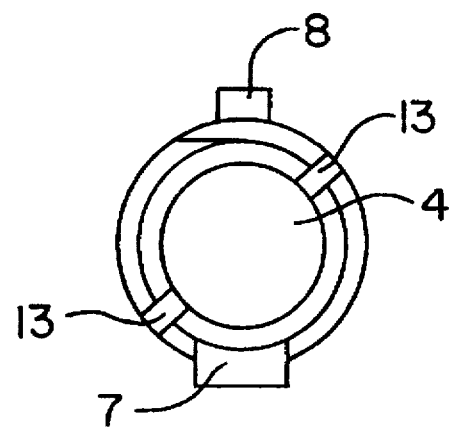
FIG. 4 shows a gripper according to FIG. 3 in a side view from the right.

The slots 13 formed in the gripper extend from one end toward the other end of the gripper over a proportion of the length of the gripper. As shown in FIG. 3, the segments 6 are formed alternately.

We claim:

1. Stud feeder with an adapter (1), in which a conveying duct (4) and a stud feed orifice (3) designed substantially perpendicularly to the conveying duct (4) are provided, with a cylindrical or slightly conical stud holder (2) arranged coaxially to the conveying duct (4) and with a loading pin (10) which is capable of moving to and fro in the conveying duct (4) and displaces studs (9) from the stud feed orifice (3) to the stud holder (2), characterized in that the conveying duct (4) is formed by a tubular gripper (5) which is slotted at least over a proportion of its length, and the gripper segments (6) are resilient substantially perpendicularly to their length.

2. Stud feeder according to claim 1, characterized in that the gripper (5) is slotted from both ends alternately.

3. Stud holder according to claim 1, characterized in that the slots (13) are equidistant from one another.

4. Stud holder according to claim 1, characterized in that the gripper (5) is designed with an entry bevel (11) at the stud inlet end.

5. Stud holder according to claim 1 characterized in that the gripper (5) has at least one catch nose (7; 8) penetrating into a recess formed on the adapter (1) preferably at the stud inlet end.

6. Stud holder according to claim 1 characterized in that the gripper (5) extends at least partially into the stud feed orifice (3) without obstructing a stud feed means.

7. Stud holder according to one of claim 1 characterized in that the gripper segments (6) consist of hardened spring steel.

8. Stud holder according to one of claim 1, characterized in that the gripper segments (6) are provided with a very hard coating.

* * * * *